United States Patent [19]

Pointer, Jr.

[11] Patent Number: 4,562,959
[45] Date of Patent: Jan. 7, 1986

[54] DRIP IRRIGATOR FOR HANGING BASKETS

[76] Inventor: Odell Pointer, Jr., 1317 Finch St., Houston, Tex. 77009

[21] Appl. No.: 225,450

[22] Filed: Jan. 15, 1981

Related U.S. Application Data

[62] Division of Ser. No. 72,348, Sep. 4, 1979, Pat. No. 4,270,696.

[51] Int. Cl.$^4$ .............................................. A01G 9/02
[52] U.S. Cl. ......................................... 239/38; 47/67; 47/79; 239/541; 239/562
[58] Field of Search ....................... 239/37, 38, 39, 40, 239/41, 42, 43, 57, 34, 32, 17, 20, 504, 99, 537, 540, 541, 569, 579, 562; 47/67, 71, 73, 79, 61

[56] References Cited

U.S. PATENT DOCUMENTS 1,745,297  1/1930  Harry ................................... 239/504
3,930,334  1/1976  Johnston .......................... 239/20 X
4,170,089  10/1979  Smrt ........................................ 47/67

FOREIGN PATENT DOCUMENTS 560327  1/1972  Australia .................................. 47/61
1141377  9/1957  France ..................................... 47/61

*Primary Examiner*—Andres Kashnikow
*Attorney, Agent, or Firm*—Neal J. Mosely

[57] ABSTRACT

Basic form is a conical reservoir, small end up and provided with a hook whereby the irrigator may be suspended from the same bracket used to support the hanging basket. A multiplicity of small openings downwardly through the base of the irrigator permits a slow dripping of a solution stored in the reservoir, and a larger opening at the top keeps atmosphereic pressure on the top of the solution. In one refinement the base is provided with a number of downwardly extending channels to which the small openings may be limited. In another modification the distribution network is separated from the reservoir and is disposed just below it. The two parts are normally connected for flow by a plug connector which has a second or raised position wherein the flow passages are sealed to prevent any flow.

3 Claims, 7 Drawing Figures

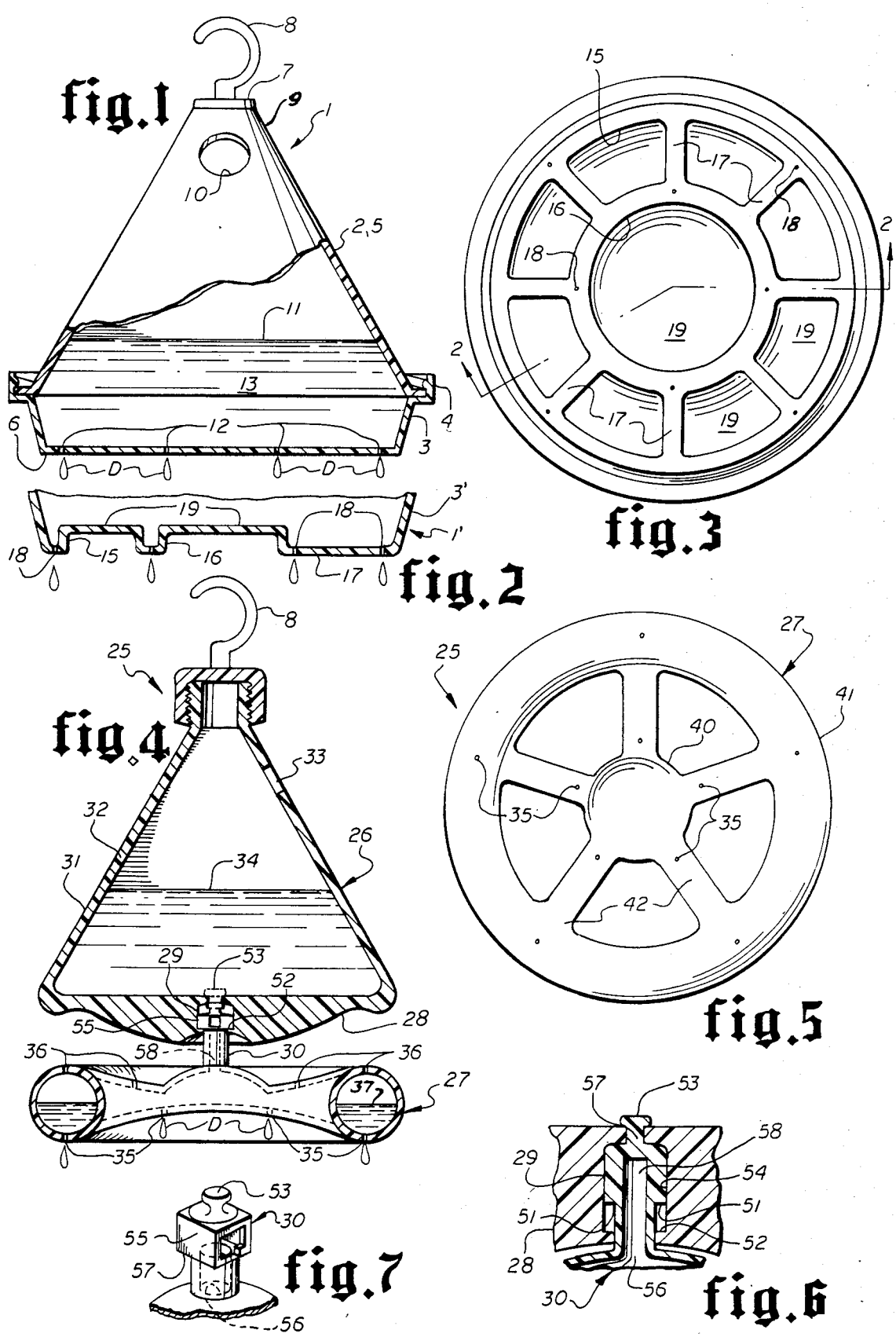

DRIP IRRIGATOR FOR HANGING BASKETS

RELATIONSHIP TO PRIOR APPLICATIONS

The present application is a division of a co-pending prior application of the same inventor, Ser. No. 72,348, filed Sept. 4, 1979, now U.S. Pat. No. 4,270,696, and contains no new subject matter.

BACKGROUND OF THE INVENTION

The present invention lies in the general field of watering devices for plants, and more particularly concerns the watering of plants held in baskets suspended from brackets. Typically, three or more wire cables or cords connected to equally spaced points around the periphery of the basket extend to a center point above the basket, where they are joined to a ring or hook.

The present inventor has noted that most plants grown in hanging baskets are still being watered by the traditional watering can. This is frequently unsatisfactory and messy, as water is often spilled and sometimes the user is so impatient that he fails to supply an adequate amount of water.

As a general rule, the recommended practice is to water most plants infrequently, but to thoroughly saturate the root system when doing any watering. This implies adding sufficient water (or solution, if the water includes soluble nutrient) to fill the pot or other container, but without overflowing it. Adding water by a can is all too likely to overflow the pot before the root system is saturated, so a technique for adding water at a slower rate and in a predetermined quantity is indicated. At the same time, the technique and equipment to implement it should preferably relieve the gardener from the tedium of an eyedropper approach. In commercial installations mistfogging equipment, timers and clock-controlled valves can be used, but the present inventor is concerned more with the home gardener, for whom such elaborate apparatus is economically unfeasible.

PRIOR ART

The present inventor found something of a dearth of equipment suitable for his purposes, both in the commercial market and in the patent literature. The nearest art was found in the Johnston, U.S. Pat. No. 3,930,334, although Johnston used his apparatus to create an aesthetic affect—a waterfall surrounding flora in a hanging baset—rather than for watering. Johnston discloses the use of a generally conical water container disposed above his plants, the open top container wall being provided with multiple openings so that water can pass through them and drip around the plants below in a preconceived pattern.

The Johnston apparatus is unsuitable for the present inventor's purposes for several reasons, primary among which is the fact that Johnston's conical container has its small end disposed lowermost. This not only creates a mounting probelem (the broad surface can not be disposed at the conical outline formed by the wires or cords which support the basket), but assures an uneven distribution of the descending drops—because as the water level in Johnston's container falls, its diameter and surface decrease, exposing and rendering useless any drip openings in the outer parts of the conical wall; as the water level falls lower and lower, most of the drops fall on the center area below. Also, the open-top construction implies that the filling for Johnston's container would have to be added after the container is mounted in place; it would be courting disaster to attempt to fill the container and then mount it.

Australian Patent No. 5603/27, issued Jan. 18, 1927 to S. Lowe, has also been brought to the attention of the present inventor. Lowe discloses a broad base conical reservoir adapted for mounting to water a plant in a hanging basket, but the only means he teaches for distributing the water from his reservoir is from a single opening at the center of its broad base. In this opening he provides a manually operated needle valve to control the size of the outflow, or shut it off altogether. Any such outflow, however, is necessarily a single stream directed below the center of the reservoir, something like a bung in a barrel.

SUMMARY OF THE INVENTION

The present invention takes form in a drip irrigator having as its principal component a reservoir in the general form of a hollow conical shell, which may be pointed or slightly frusto-conical, together with a hook means secured to the small end, although it may also have a disc portion below the cone. This permits hanging the irrigator from the same hook used to support the basket to be served by the irrigator, and the conical shape of the irrigator makes it unnecessary to space it from the cone formed by the wires or cords of the basket.

In this basic form, the conical shell reservoir has a broad base, preferably circular and roughly the same size as the flower pot below. Such base may be flat, and is disposed to be approximately horizontal. It is provided with a number of small openings through which water or nutrient solutin charged into the reservoir may drip to the plant below. A larger opening near the small upper end of the reservoir provides access for adding solution, and insures atmospheric pressure on the upper surface of the fluid at all times.

The drip openings are of sufficient size to ensure complete drainage of the reservoir, and they may be arranged in a pattern to provide uniform distribution of the solution on the plant below. While various materials may be used, the only requirement is that the structure be fairly rigid and light in weight. One preferred material is a clear polystrene, as it meets such requirements and can be purchased and fabricated relatively inexpensively. A transparent type makes the irrigator unobstrusive, directing the beholder's attention to the plant itself.

In a minor modification to be described, the flat nature of the reservoir base is altered by depressions which form lowermost channels. These permit complete drainage of the reservoir even when the irrigator may be somewhat tilted by luxuriant plant growth, and the channels also serve to stiffen the base.

In another modification the reservoir has no drip openings but does have a single larger opening connected to a separate distributed network disposed below the base of the reservoir. Among other reasons for such separation is a flow control connection between reservoir and distributor. A plug connector is used which has a lower position and an upper position. In the lower position fluid in the reservoir flows freely into the distributor, but the upper position provides a seal of the plug to the reservoir, blocking all flow therefrom.

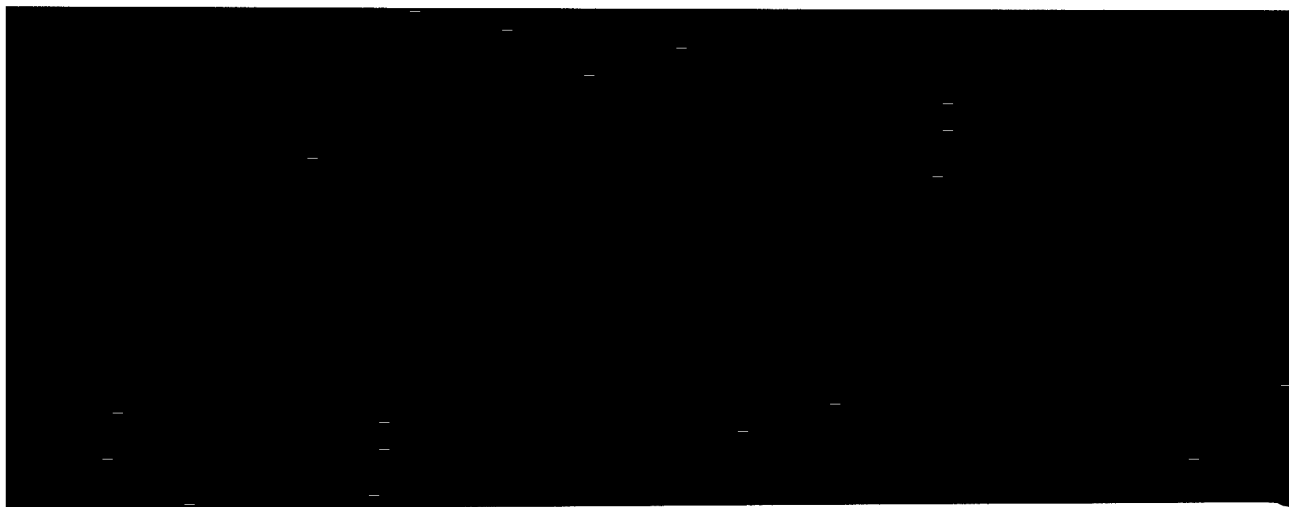
BRIEF DESCRIPTION OF THE DRAWING
phenomena as surface tension and tension between the fluid and the material defining the openings 12.

29 (53 or 28 being made of resilient material such as rubber), and rests upon the upper orifice of this neck portion 57 to provide a seal therewith. It should also be noted at this point that the bottom portion 28 of the reservoir as well as the plug connector 30 may be made of resilient material, so that it is possible to completely and replaceably separate the plug connector from the bottom 28. This makes it possible to substitute a variety of combinations, i.e., reservoirs of different diameters with distributors of different diameters. Such facility makes it possible to fit the irrigator for use with flower pots of different diameters and networks of cords which support the hanging baskets of various diameters.

Having described and illustrated one or more preferred embodiments, it is to be understood that these are illustrative only, and that the present invention is to be construed strictly in accordance with the attached claims. Such claims are to be construed to embrace all equivalent means for accomplishing substantially the same results in substantially the same manner.

What is claimed is:

1. A drip irrigator adapted for use with a hanging basket comprising hook means and a hollow, single reservoir being of generally conical shape and having a narrow upper neck secured to said hook means and tapering downwardly to a broad circular area base, said reservoir having a multiplicity of small openings through said base and dispersed over said circular area, whereby a fluid or solution in said reservoir may drip through said openings to wet a circular area of said hanging basket below, a relatively large filler opening adjacent said neck, and being sealed from the surrounding atmosphere except through said openings, said generally conical reservoir having its smaller end secured to said hook means, and said base being modified to provide its upper, interior surface with two levels of surfaces, higher level surfaces and lower level surfaces, said lower level surfaces being the bottoms of a group of interconnected channels or troughs connected to said upper level surfaces by sidewalls of said channels or troughs.

2. The drip irrigator of Claim 1 in which said interconnected channels comprise an inner circular channel, an outer circular channel, and a multiplicity of radial channels extending between the two circular channels in fluid flow communication therewith.

3. The drip irrigator of claim 1 in which said base of the reservoir has a flat upper surface and a parallel flat lower surface.

* * * * *